US012711297B2

(12) United States Patent
Sontakke

(10) Patent No.: US 12,711,297 B2
(45) Date of Patent: Aug. 18, 2026

(54) DIMENSIONAL MODEL OF A MULTI-THICKNESS OBJECT IN A COMPUTER-AIDED DESIGN ENVIRONMENT

(71) Applicant: Siemens Industry Software Inc., Plano, TX (US)

(72) Inventor: Vishal Sontakke, Maharashtra (IN)

(73) Assignee: Siemens Industry Software Inc., Plano, TX (US)

( * ) Notice: Subject to any disclaimer, the term of this patent is extended or adjusted under 35 U.S.C. 154(b) by 770 days.

(21) Appl. No.: 18/021,642

(22) PCT Filed: Aug. 31, 2020

(86) PCT No.: PCT/US2020/048787
§ 371 (c)(1),
(2) Date: Feb. 16, 2023

(87) PCT Pub. No.: WO2022/046114
PCT Pub. Date: Mar. 3, 2022

(65) Prior Publication Data
US 2023/0315965 A1 Oct. 5, 2023

(51) Int. Cl.
*G06F 30/39* (2020.01)
*G06F 30/31* (2020.01)
*G06F 113/10* (2020.01)

(52) U.S. Cl.
CPC .............. *G06F 30/39* (2020.01); *G06F 30/31* (2020.01); *G06F 2113/10* (2020.01)

(58) Field of Classification Search
CPC .................................................... G06F 30/398
(Continued)

(56) References Cited

U.S. PATENT DOCUMENTS

| | | | | |
|---|---|---|---|---|
| 7,409,667 B1 * | 8/2008 | Pritchard | G06F 30/39 716/139 |
| 2004/0153200 A1 | 8/2004 | Landers et al. | |

(Continued)

FOREIGN PATENT DOCUMENTS

| | | |
|---|---|---|
| CN | 111552374 A | 8/2020 |
| EP | 1443435 A2 | 8/2004 |

(Continued)

OTHER PUBLICATIONS

Amy, Robin Alastair, Guglielmo S. Aglietti, and Guy Richardson. "Simplified modelling of printed circuit boards for spacecraft applications." Acta Astronautica 65.1-2 (2009): 192-201.

(Continued)

*Primary Examiner* — Suchin Parihar
(74) *Attorney, Agent, or Firm* — LEMPIA SUMMERFIELD KATZ LLC

(57) ABSTRACT

A method and system for generating a three-dimensional model of a multi-thickness object in a formed state in a computer-aided design (CAD) environment is disclosed. In one embodiment, a method includes receiving a request to generate a feature of a three-dimensional model. The method includes creating a virtual datum plane, and dynamically computing an offset value for the feature with reference to the virtual datum plane based on a thickness value. The offset value determines an offset between the virtual datum plane and one of the surfaces of the feature. The method includes generating the feature of the three-dimensional model in the formed state with reference to the virtual datum plane based on the thickness value, a location of the feature
(Continued)

and the offset value. Moreover, the method includes outputting the three-dimensional model of the multi-thickness object having the generated feature in the formed state.

17 Claims, 11 Drawing Sheets

(58) Field of Classification Search
USPC .......................................................... 716/100
See application file for complete search history.

(56) References Cited

U.S. PATENT DOCUMENTS

| | | | |
|---|---|---|---|
| 2004/0153201 A1 | 8/2004 | Landers et al. | |
| 2015/0201499 A1* | 7/2015 | Shinar | H05K 1/0284 425/132 |
| 2017/0118838 A1* | 4/2017 | Williams | H05K 3/361 |
| 2017/0239892 A1* | 8/2017 | Buller | B28B 17/0081 |
| 2019/0317566 A1* | 10/2019 | Schnell | G06F 1/185 |
| 2020/0258315 A1 | 8/2020 | Li et al. | |
| 2022/0379381 A1* | 12/2022 | Buller | B29C 64/386 |

FOREIGN PATENT DOCUMENTS

| | | | |
|---|---|---|---|
| JP | 2006048147 | A | 2/2006 |
| KR | 20120001642 | A | 1/2012 |
| WO | 2008001077 | A1 | 1/2008 |
| WO | 2015187600 | A1 | 12/2015 |

OTHER PUBLICATIONS

International Search Report and Written Opinion for International App. No. $nbsp;PCT/US2020,048787 mailed May 28, 2021.
Yaddanapudi, Vamsi Krishna, et al. "Validation of new approach of modelling traces by mapping mechanical properties for a printed circuit board mechanical analysis." 2015 IEEE 17th Electronics Packaging and Technology Conference (EPTC). IEEE, 2015.
Zukowski, Elena, et al. "Efficient modeling of printed circuit boards structures for dynamic simulations." 2015 16th International Conference on Thermal, Mechanical and Multi-Physics Simulation and Experiments in Microelectronics and Microsystems. IEEE, 2015.

* cited by examiner

Figure 2 contd...
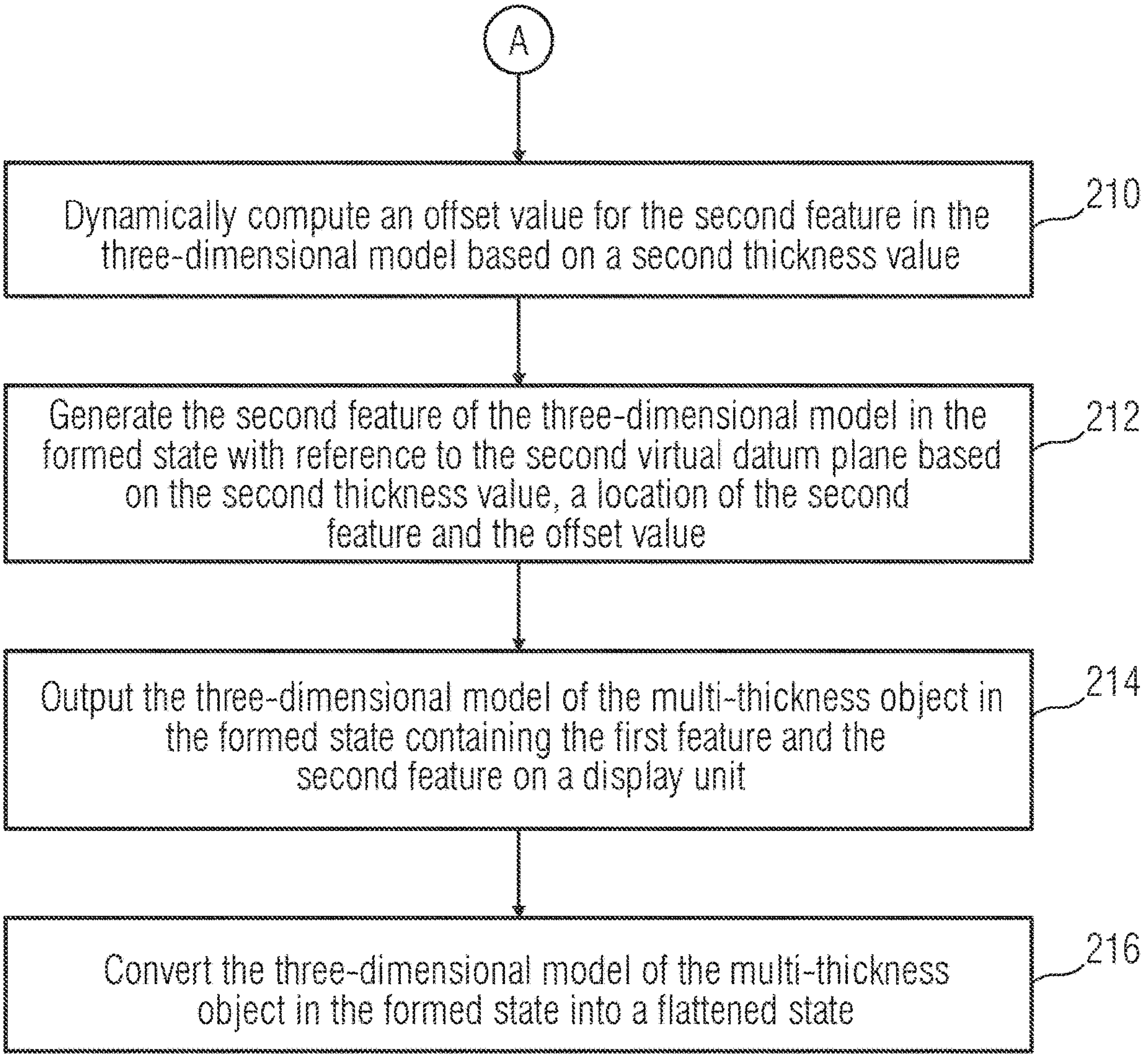

300

Cloud Computing System 302

CAD Module 114

Geometric Model Database 116

Cloud Computing Platform 308

Cloud Computing Hardware and OS 306

Cloud Communication Interface 304

Network 310

User Device 312A

Graphical User Interface 314A

User Device 312B

Graphical User Interface 314B

User Device 312N

Graphical User Interface 314N

DIMENSIONAL MODEL OF A MULTI-THICKNESS OBJECT IN A COMPUTER-AIDED DESIGN ENVIRONMENT

CROSS REFERENCE TO RELATED APPLICATIONS

This present patent document is a § 371 nationalization of PCT Application Serial Number PCT/US2020/048787, filed Aug. 31, 2020, designating the United States, which is hereby incorporated in its entirety by reference.

FIELD

Embodiments relate to a method and system for generating a three-dimensional model of a multi-thickness object in a CAD environment.

BACKGROUND

Computer-aided design (CAD) tools enable users to design physical objects.

Typically, CAD tools enable design of physical objects with features have different thickness in a flattened state (tow-dimensional form). The physical objects such as Printed Circuit Boards (PCBs) are connected by flexible sections based on scheme definition. Each of PCBs and flexible sections (hereinafter referred as 'features') are considered as unique zones. Each zone has a different thickness and different offset from top of the PCB in its flattened state, wherein the top of the PCB is located at a global datum plane.

Currently known CAD tools allow designing of multi-thickness objects such as PCBs connected by flexible sections in a two-dimensional form (i.e., flattened state). However, currently known CAD tools may not have provision to design multi-thickness objects in a three-dimensional form (i.e., formed state). This is due to the fact that global datum plane is stationary which may pose a challenge in designing multi-thickness objects with features not in same plane as that of the global datum plane. Also, any modification to features in one zone may affect downstream features in other zones in the multi-thickness object which may violate requirement of the users.

SUMMARY

The scope of the present disclosure is defined solely by the appended claims and is not affected to any degree by the statements within this description. The present embodiments may obviate one or more of the drawbacks or limitations in the related art. A method and system of a three-dimensional model of a multi-thickness object in a computer-aided design (CAD) environment is disclosed.

In one aspect, a method includes generating a first feature of a three-dimensional model of a multi-thickness object in a formed state with reference to a first virtual datum plane based on a first thickness value of the first feature. The method includes receiving a request to generate a second feature of the three-dimensional model from a user. The request includes a second thickness value of the second feature and location of the second feature. The method includes creating a second virtual datum plane which is aligned with the first virtual datum plane, and dynamically computing an offset value for the second feature in the three-dimensional model with reference to the second virtual datum plane based on the second thickness value. The offset value indicates a distance by which the second feature is to be offset from the second virtual datum plane.

The method includes generating the second feature of the three-dimensional model in the formed state with reference to the second virtual datum plane based on the second thickness value, the location of the second feature and the offset value. The generated second feature is offset from the second virtual datum plane by the offset value. Moreover, the method includes outputting the three-dimensional model of the multi-thickness object in the formed state including the first feature and the second feature. The first thickness value of the first feature is different than the second thickness value of the second feature. The first virtual datum plane and the second virtual datum plane may lie on a global virtual datum plane in the flattened state. The second feature may be offset by the offset value from the global virtual datum plane in the flattened state. Furthermore, the first feature and the second feature may belong to same zone and different zones. Additionally, the method may include converting the three-dimensional model of the multi-thickness object in the formed state to a flattened state. Also, the method may include creating the first virtual datum plane in the CAD environment.

In dynamically computing the offset value for the second feature in the three-dimensional model with reference to the second virtual datum plane based on the second thickness value, the method includes determining an element of the first feature for creating the second feature, and dynamically computing the offset value for the second feature with reference to the second virtual datum plane based on the determined element and the second thickness value of the second feature.

In another aspect, a data processing system includes a processing unit, and a memory unit communicatively coupled to the processing unit. The memory unit includes a CAD module configured to generate a first feature of a three-dimensional model of a multi-thickness object in a formed state with reference to a first virtual datum plane based on a first thickness value of the first feature. The CAD module is configured to receive a request to generate a second feature of the three-dimensional model from a user. The request includes a second thickness value of the second feature and location of the second feature. The CAD module is configured to create a second virtual datum plane which is aligned with the first virtual datum plane, and dynamically compute an offset value for the second feature in the three-dimensional model with reference to the second virtual datum plane based on the second thickness value. The offset value determines an offset between the second virtual datum plane and one of the surfaces of the second feature.

The CAD module is configured to generate the second feature of the three-dimensional model in the formed state with reference to the second virtual datum plane based on the second thickness value, the location of the second feature and the offset value. The generated second feature is offset from the second virtual datum plane. Moreover, the CAD module is configured to output the three-dimensional model of the multi-thickness object in the formed state including the first feature and the second feature. The first thickness value of the first feature is different than the second thickness value of the second feature. The first virtual datum plane and the second virtual datum plane may lie on a global virtual datum plane in the flattened state. The second feature may be offset by the offset value from the global virtual datum plane in the flattened state. Furthermore, the first feature and the second feature may belong to same zone and different zones. Additionally, the CAD module may be configured to convert the three-dimensional model of the multi-thickness object in the formed state to a flattened state. Also, the CAD module may be configured to create the first virtual datum plane in the CAD environment.

In dynamically computing the offset value for the second feature in the three-dimensional model with reference to the second virtual datum plane based on the second thickness value, the CAD module may be configured to determine an element of the first feature for creating the second feature, and dynamically compute the offset value for the second feature with reference to the second virtual datum plane based on the determined element and the second thickness value of the second feature.

In yet another aspect, a non-transitory computer-readable storage medium, including machine-readable instructions stored therein, which when executed by a data processing system, cause the data processing system to perform a method described above.

This summary is provided to introduce a selection of concepts in a simplified form that are further described below in the following description. It is not intended to identify features or essential features of the claimed subject matter. Furthermore, the claimed subject matter is not limited to implementations that solve any or all disadvantages noted in any part of this disclosure.

DETAILED DESCRIPTION

Figure 1:
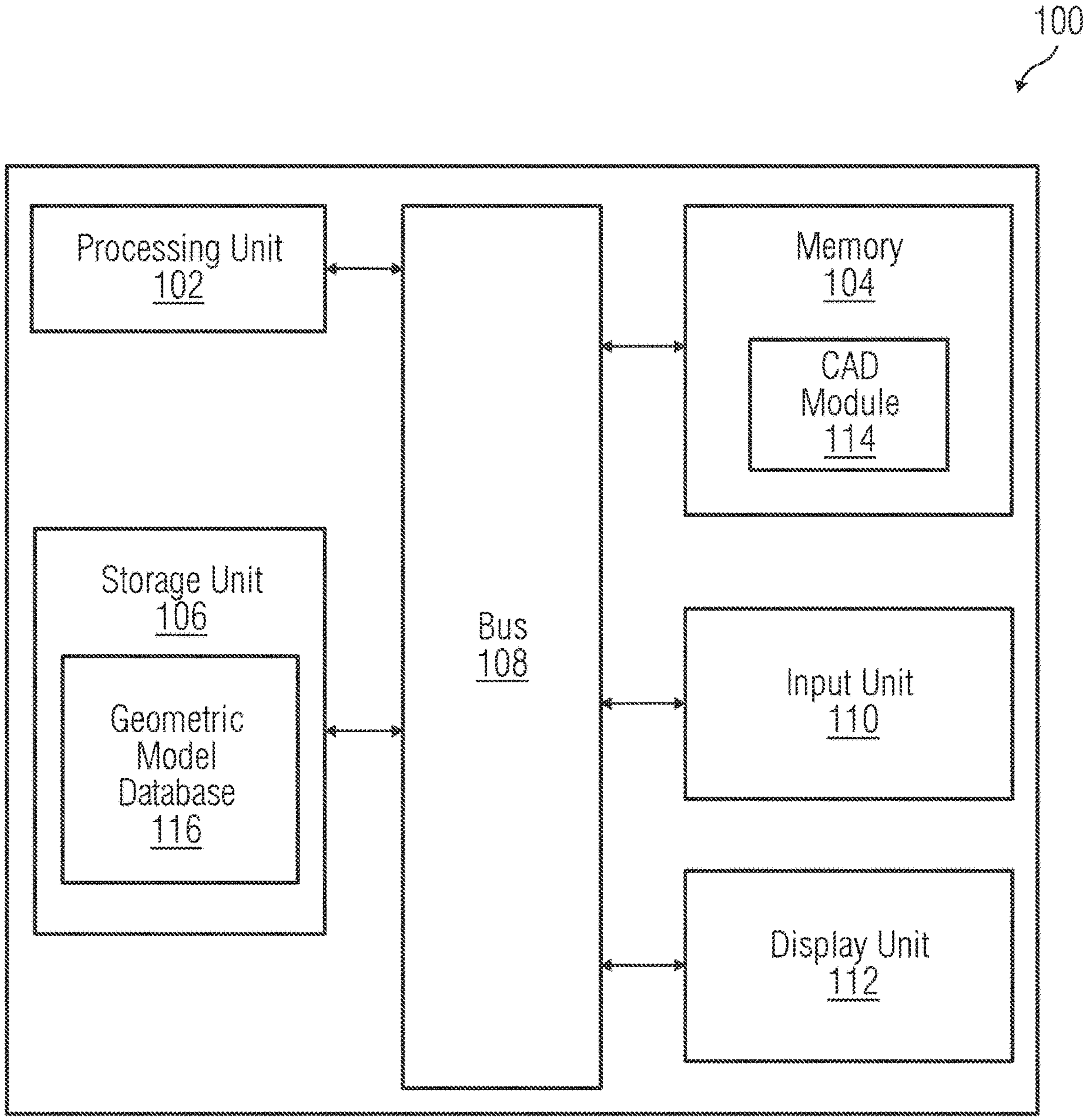
FIG. 1 is a block diagram of a data processing system for a three-dimensional model of a multi-thickness object in a computer-aided design (CAD) environment, according to one embodiment.

A method and system for a three-dimensional model of a multi-thickness object in a computer-aided design (CAD) environment is disclosed. Various embodiments are described with reference to the drawings, where like reference numerals are used in reference to the drawings. Like reference numerals are used to refer to like elements throughout. In the following description, numerous specific details are set forth in order to provide a thorough understanding of embodiments. These specific details need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is no intent to limit the disclosure to the particular forms disclosed. Instead, the disclosure is to cover all modifications, equivalents, and alternatives falling within the spirit and scope of the present disclosure.

FIG. 1 is a block diagram of a data processing system 100 for a three-dimensional model of a multi-thickness object in a computer-aided design (CAD) environment, according to one embodiment. The data processing system 100 may be a desktop computer, laptop computer, a tablet PC, a workstation, and the like. In FIG. 1, the data processing system 100 includes a processing unit 102, a memory unit 104, a storage unit 106, a bus 108, an input unit 110, and a display unit 112. The data processing system 100 is a specific purpose computer configured to trim intersecting bodies of a geometric model.

The processing unit 102, as used herein, means any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 102 may also include embedded controllers, such as generic or programmable logic devices or arrays, application specific integrated circuits, single-chip computers, and the like.

The accessible memory unit 104 may be non-transitory volatile memory and non-volatile memory. The memory unit 104 may be coupled for communication with the processing unit 102, such as being a computer-readable storage medium. The processing unit 102 may execute instructions and/or code stored in the memory unit 104. A variety of computer-readable instructions may be stored in and accessed from the memory unit 104. The memory unit 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In the present embodiment, the memory unit 104 includes a CAD module 114 stored in the form of machine-readable instructions on any of the above-mentioned storage media and may be in communication to and executed by the processing unit 102. When the machine-readable instructions are executed by the processing unit 102, the CAD module 114 causes the processing unit 102 to generate a three-dimensional model of a multi-thickness object in a formed state. The multi-thickness object may be an object with different connecting regions of a body have different thickness values. An example is a PCB component where two boards of different thicknesses are connected by a cable having a different thickness than the boards. The formed state is a state in which features are designed in three-dimensional mode. In the three-dimensional mode, the features are curved or planar. In one embodiment, the CAD module 114 is configured to generate a first feature of the three-dimensional model of the multi-thickness object in the formed state with reference to a first virtual datum plane based on a thickness value of the first feature. In one embodiment, the first feature can be a body creating feature such as base planar segment (e.g., a printed circuit board). In this embodiment, the first virtual datum plane is a global virtual datum plane and is located at an offset distance from the first feature of the multi-thickness object.

The CAD module 114 is configured to receive a request to generate a second feature of the three-dimensional model from a user. The request includes a thickness value of the second feature and location of the second feature. In one embodiment, the second feature may include body extending feature such as flexible section connecting two PCBs. It can be noted that the thickness of the second feature is different than the thickness of the first feature. The CAD module 114 is configured to create a second virtual datum plane which is aligned with the first virtual datum plane, and dynamically compute an offset value for the second feature in the three-dimensional model with reference to the second virtual datum plane based on the thickness value of the second feature. In one embodiment, the second virtual datum plane is a local virtual datum plane located at an offset distance from the first virtual datum plane. The offset value indicates a distance by which the second feature is to be offset from the second virtual datum plane.

Furthermore, the CAD module 114 is configured to generate the second feature of the three-dimensional model in the formed state with reference to the second virtual datum plane based on the thickness value of the second feature, the location of the second feature and the offset value. The generated second feature is offset from the second virtual datum plane by the offset value. Moreover, the CAD module 114 is configured to output the three-dimensional model of the multi-thickness object in the formed state comprising the first feature and the second feature. Also, the CAD module 114 is configured to convert the three-dimensional model of the multi-thickness object in the formed state to a flattened state. The flattened state is a state of the multi-thickness object when all curved faces in the multi-thickness object have been converted into planar faces based on the location of a neutral layer. The neutral layer is defined as a layer in a material where there is neither tension nor compression. Method steps performed by the processing unit 102 to achieve the above functionality are described in greater detail in FIG. 2.

The storage unit 106 may be a non-transitory storage medium which stores a geometric model database 116. The geometric model database 116 stores three-dimensional models of multi-thickness objects. The input unit 110 may include input devices such as keypad, touch-sensitive display, camera (such as a camera receiving gesture-based inputs), etc. capable of receiving input signals such as for requesting generation of a feature in a three-dimensional model. The display unit 112 may be a device with a graphical user interface displaying a multi-dimensional visual representation of the three-dimensional model. The graphical user interface may also enable users to request for generation of the three-dimensional model, request for generation of a feature in the three-dimensional model, select a thickness value of the feature, select location of the feature. The bus 108 acts as interconnect between the processing unit 102, the memory unit 104, the storage unit 106, the input unit 110, and the display unit 112.

Those of ordinary skilled in the art will appreciate that the hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition to or in place of the hardware depicted. The depicted example is provided for the purpose of explanation only and is not meant to imply architectural limitations with respect to the present disclosure.

The data processing system 100 in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Washington may be employed if suitably modified. The operating system is modified or created in accordance with the present disclosure as described.

Figure 2:
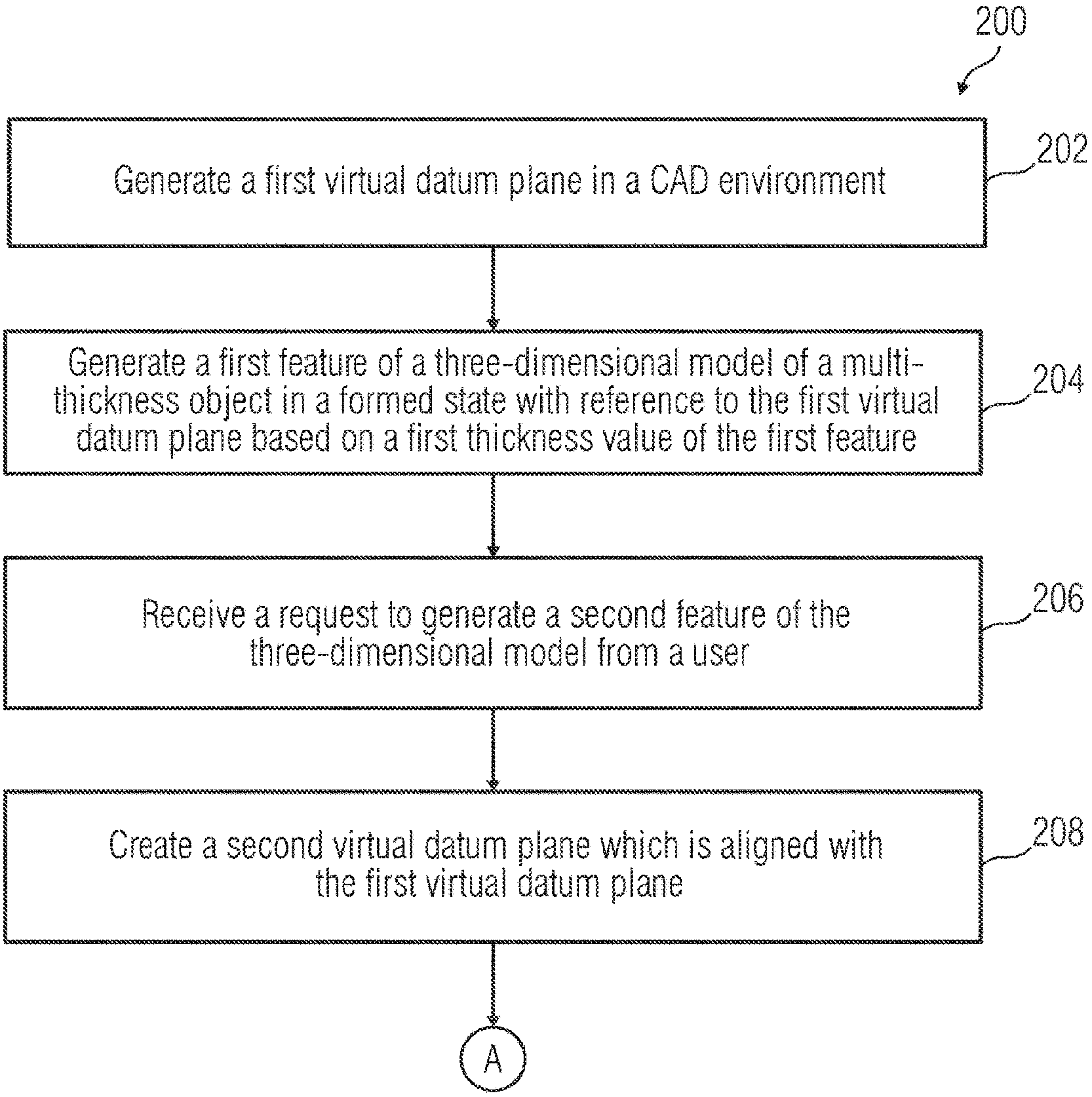
FIG. 2 is a process flowchart of an exemplary method of a three-dimensional model of a multi-thickness object in a CAD environment, according to one embodiment.

FIG. 2 is a process flowchart 200 of a method of generating a three-dimensional model of a multi-thickness object in a CAD environment, according to one embodiment. At act 202, a first virtual datum plane is generated in a CAD environment. At act 204, a first feature of a three-dimensional model of a multi-thickness object is generated in a formed state with reference to the first virtual datum plane based on a first thickness value of the first feature. The first virtual datum is located opposite to direction of thickness direction of a first feature.

At act 206, a request to generate a second feature of the three-dimensional model is received from a user. The request includes a second thickness value of the second feature and location of the second feature. The thickness of the second feature is different than the thickness of the first feature. At act 208, a second virtual datum plane which is aligned with the first virtual datum plane is created.

At act 210, an offset value for the second feature in the three-dimensional model is dynamically computed based on the second thickness value. In some embodiments, an element of the first feature is determined for creating the second feature based on the location of the second feature. For example, the element of the first feature may be an edge or face of the first feature. Accordingly, the offset value for the second feature is dynamically computed with reference to the second virtual datum plane based on the determined element and the second thickness value of the second feature. The offset value indicates distance by which the second feature is to be offset from the second virtual datum plane. In some embodiments, a relative offset from the second virtual datum plane is computed based on the thickness and offset of the first feature and the second feature in such a manner that the first virtual datum plane and the second virtual datum plane are aligned. In these embodiments, the relative offset is computed based on whether face or edge of the first feature selected for generating the second feature is on a datum side or a non-datum side. The datum side is a side of the first feature which is coincident with the first virtual datum place and the non-datum side is the side opposite to the datum side. The relative offset is positive offset value if the selected face or edge is on the datum side and negative offset value if the selected face or edge is on the on-datum side. If the face or edge is on the non-datum side, then thickness of the first feature and the thickness of second feature is not considered for computing the relative offset.

At act 212, the second feature of the three-dimensional model is generated in the formed state with reference to the second virtual datum plane based on the second thickness value, the location of the second feature and the offset value. The generated second feature is offset from the second virtual datum plane by the offset value. At act 214, the three-dimensional model of the multi-thickness object in the formed state containing the first feature and the second feature is outputted on the display unit 110. The first feature and the second feature may belong to a same zone or a different zones.

At step 216, the three-dimensional model of the multi-thickness object in the formed state is converted into a flattened state. In the flattened state, the first virtual datum plane and the second virtual datum plane lie on a global virtual datum plane. Also, the second feature is offset by the offset value from the global virtual datum plane in the flattened state. Also, in the flattened state, zone definition associated with the first feature and the second feature remains intact.

Figure 3:
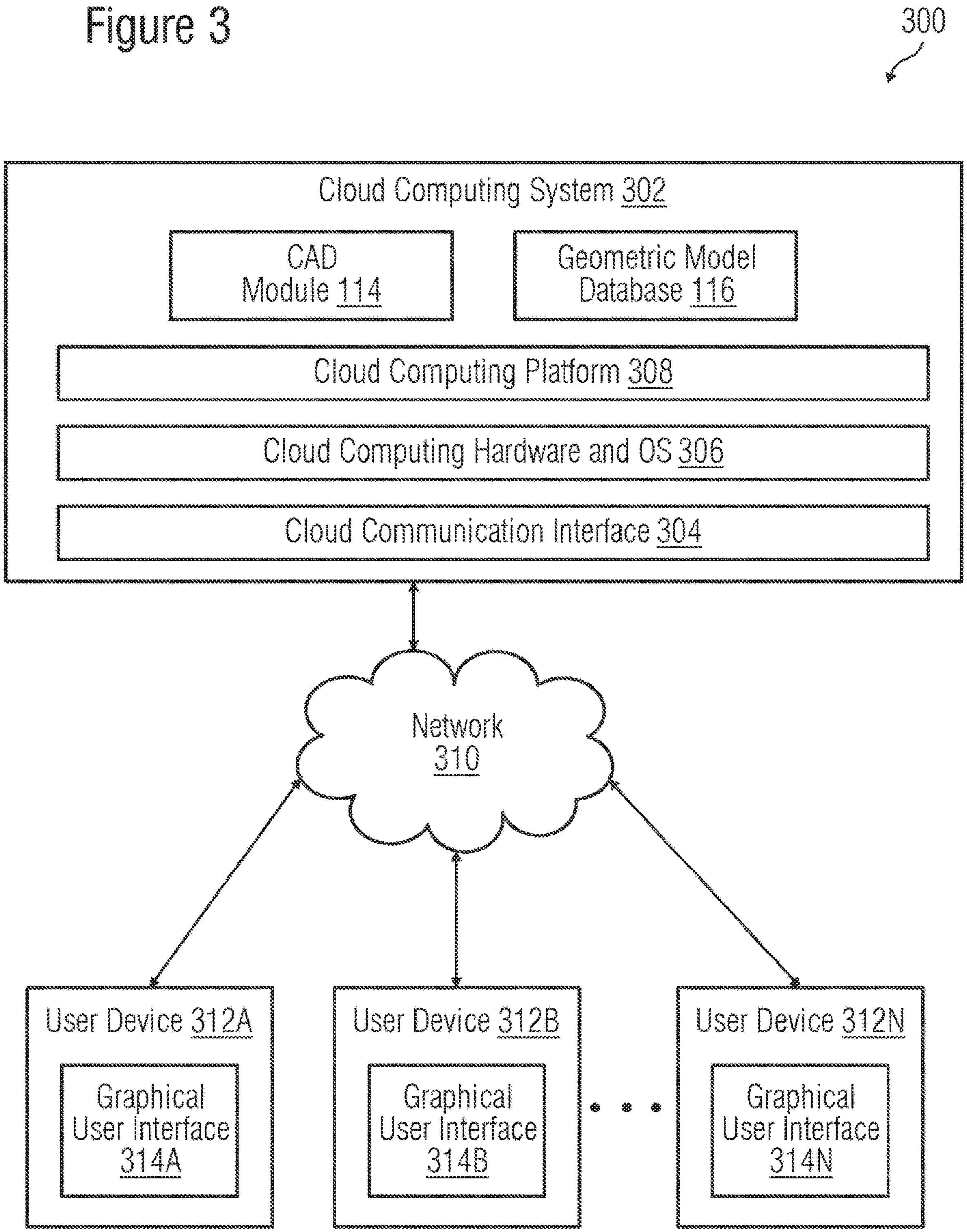
FIG. 3 is a schematic representation of a data processing system for performing a trim operation on intersecting bodies on a geometric model in a CAD environment, according to another embodiment.

FIG. 3 is a schematic representation of a data processing system 300 for a three-dimensional model of a multi-thickness object in a CAD environment, according to another embodiment. The data processing system 300 may include a cloud computing system 302 configured for providing cloud services for designing multi-thickness objects.

The cloud computing system 302 includes a cloud communication interface 306, cloud computing hardware and OS 308, a cloud computing platform 310, the CAD module 114, and the geometric model database 116. The cloud communication interface 306 enables communication between the cloud computing platform 310, and user devices 312A-N such as smart phone, tablet, computer, etc. via a network 304.

The cloud computing hardware and OS 308 may include one or more servers on which an operating system (OS) is installed and includes one or more processing units, one or more storage devices for storing data, and other peripherals required for providing cloud computing functionality. The cloud computing platform 310 is a platform which implements functionalities such as data storage, data analysis, data visualization, data communication on the cloud hardware and OS 308 via Application Programming Interfaces (APIs) and algorithms; and delivers the aforementioned cloud services using cloud-based applications (e.g., computer-aided design application). The cloud computing platform 310 employs the CAD module 114 for generating a three-dimensional model of a multi-thickness object as described in FIG. 2. The cloud computing platform 310 also includes the geometric model database 116 for storing three-dimensional models and/or computer-aided design files for manufacturing the components using additive manufacturing process. The cloud computing platform 310 may include a combination of dedicated hardware and software built on top of the cloud hardware and OS 308.

In accordance with the foregoing embodiments, the cloud computing system 302 may enable users to generate three-dimensional models of multi-thickness objects in a CAD environment. The CAD module 114 may be configured to generate a first feature of a three-dimensional model of a multi-thickness object in a formed state with reference to a first virtual datum plane based on a thickness value of the first feature. The CAD module 114 is configured to receive a request to generate a second feature of the three-dimensional model from a user. The request includes a thickness value of the second feature and location of the second feature. The thickness of the second feature is different than the thickness of the first feature.

The CAD module 114 is configured to create a second virtual datum plane which is aligned with the first virtual datum plane, and dynamically compute an offset value for the second feature in the three-dimensional model with reference to the second virtual datum plane based on the thickness value of the second feature. The offset value indicates a distance by which the second feature is to be offset from the second virtual datum plane. Furthermore, the CAD module 114 is configured to generate the second feature of the three-dimensional model in the formed state with reference to the second virtual datum plane based on the thickness value of the second feature, the location of the second feature and the offset value. The generated second feature is offset from the second virtual datum plane by the offset value. Moreover, the CAD module 114 is configured to output the three-dimensional model of the multi-thickness object in the formed state comprising the first feature and the second feature. Also, the CAD module 114 is configured to convert the three-dimensional model of the multi-thickness object in the formed state to a flattened state.

The user devices 312A-N include graphical user interfaces 314A-N for receiving a selection of CAD commands, provide inputs such as thickness and location of features, and displaying CAD environment with three-dimensional models. Each of the user devices 312A-N may be provided with a communication interface for interfacing with the cloud computing system 302. Users of the user devices 312A-N can access the cloud computing system 302 via the graphical user interfaces 314A-N. For example, the users may send request to the cloud computing system 302 to generate a three-dimensional model of a multi-thickness object. The graphical user interfaces 314A-N may be specifically designed for accessing the CAD module 114 in the cloud computing system 302.

Figure 4:
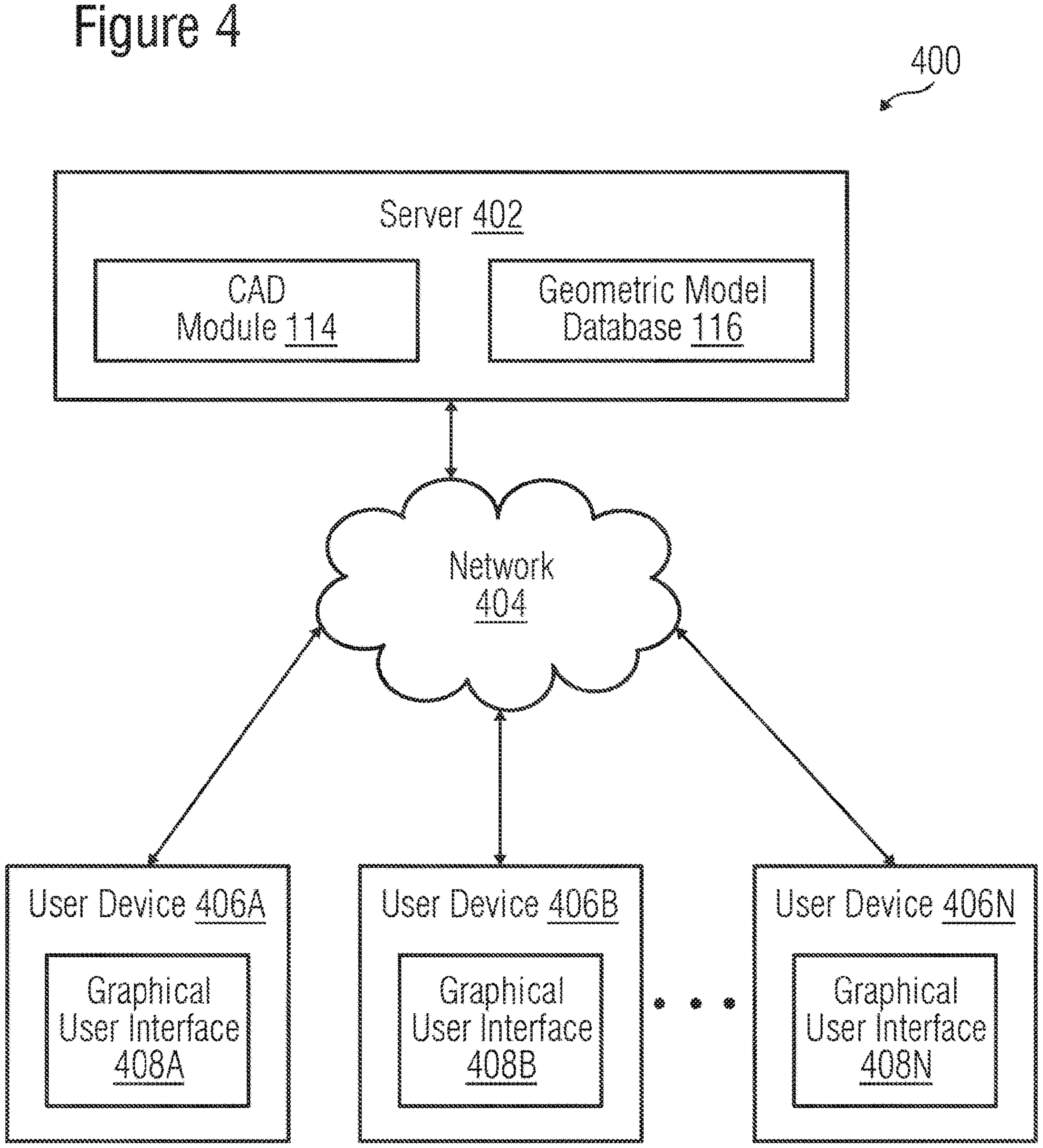
FIG. 4 illustrates a block diagram of a data processing system for generating a three-dimensional model of a multi-thickness object in a CAD environment, according to yet another embodiment.

FIG. 4 illustrates a block diagram of a data processing system 400 for generating a three-dimensional model of a multi-thickness object in a CAD environment, according to yet another embodiment. The data processing system 400 may include a server 402 and a plurality of user devices 406A-N. Each of the user devices 406A-N is connected to the server 402 via a network 404 (e.g., Local Area Network (LAN), Wide Area Network (WAN), Wi-Fi, etc.). The data processing system 400 is another implementation of the data processing system 100 of FIG. 1, wherein the CAD module 114 resides in the server 402 and is accessed by user devices 406A-N via the network 404.

The server 402 includes the CAD module 114, and the geometric model database 116. The server 402 may also include a processing unit, a memory unit, and a storage unit. The CAD module 114 may be stored on the memory in the form of machine-readable instructions and executable by the processing unit. The geometric model database 116 may be stored in the storage unit. The server 402 may also include a communication interface for enabling communication with client devices 406A-N via the network 404.

When the machine-readable instructions are executed, the CAD module 114 causes the server 402 to generate a three-dimensional model of a multi-thickness object. The CAD module 114 may be configured to generate a first feature of a three-dimensional model of a multi-thickness object in a formed state with reference to a first virtual datum plane based on a thickness value of the first feature. The CAD module 114 is configured to receive a request to generate a second feature of the three-dimensional model from a user. The request includes a thickness value of the second feature and location of the second feature. The thickness of the second feature is different than the thickness of the first feature. The CAD module 114 is configured to create a second virtual datum plane which is aligned with the first virtual datum plane, and dynamically compute an offset value for the second feature in the three-dimensional model with reference to the second virtual datum plane based on the thickness value of the second feature. The offset value indicates a distance by which the second feature is to be offset from the second virtual datum plane.

Furthermore, the CAD module 114 is configured to generate the second feature of the three-dimensional model in the formed state with reference to the second virtual datum plane based on the thickness value of the second feature, the location of the second feature and the offset value. The generated second feature is offset from the second virtual datum plane by the offset value. Moreover, the CAD module 114 is configured to output the three-dimensional model of the multi-thickness object in the formed state comprising the first feature and the second feature. Also, the CAD module 114 is configured to convert the three-dimensional model of the multi-thickness object in the formed state to a flattened state. Method steps performed by the server 402 to achieve the above-mentioned functionality are described in greater detail in FIG. 2.

The user devices 406A-N include graphical user interfaces 408A-N for receiving a selection of CAD commands and displaying a CAD environment including three-dimensional models. Each of the user devices 406A-N may be provided with a communication interface for interfacing with the server 402. Users of the user devices 406A-N can access the server 402 via the graphical user interfaces 408A-N. For example, the users may send request to the server 402 to generate a three-dimensional model of a multi-thickness object. The graphical user interfaces 408A-N may be specifically designed for accessing the CAD module 114 in the server 402.

Figure 5A:
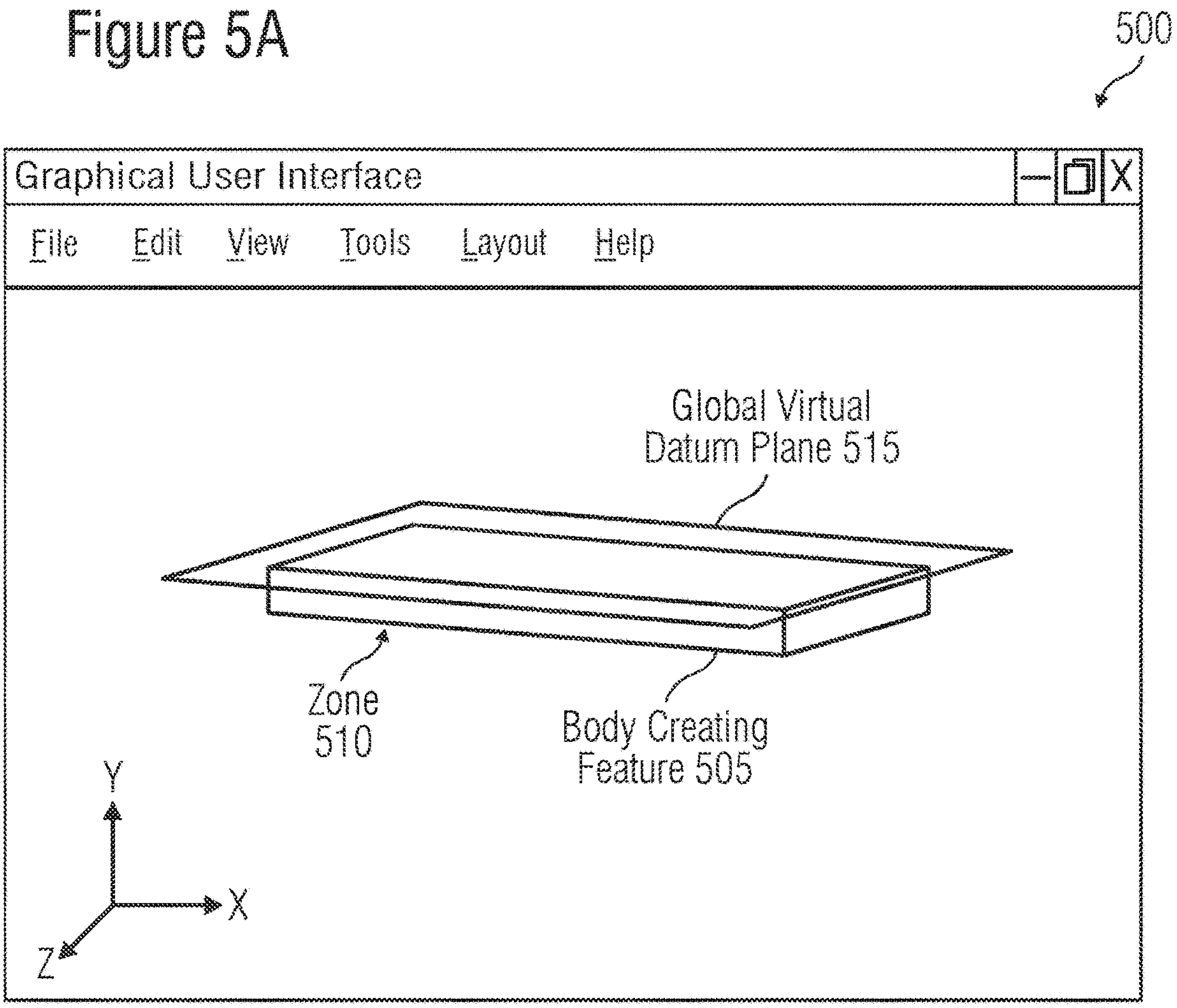
FIGS. 5A-D are graphical user interface views depicting generation of a three-dimensional model for a printed circuit board (PCB) assembly, according to one embodiment.

FIGS. 5A-D are graphical user interface views 500, 525, 550 and 575 depicting generation of a three-dimensional model 595 for a flexible printed circuit board (PCB) assembly, according to one embodiment. As shown in the graphical user interface 500, a body creating feature 505 (e.g., PCB) is created in a zone 510. The body creating feature 505 defines a global virtual datum plane 515 for the PCB assembly. In one embodiment, the zone 510 has a zero offset with respect to the global virtual datum plane 515 as shown in FIG. 5A. In another embodiment, the zone 510 may have non-zero offset with respect to the global virtual datum plane 515.

Figure 5B:
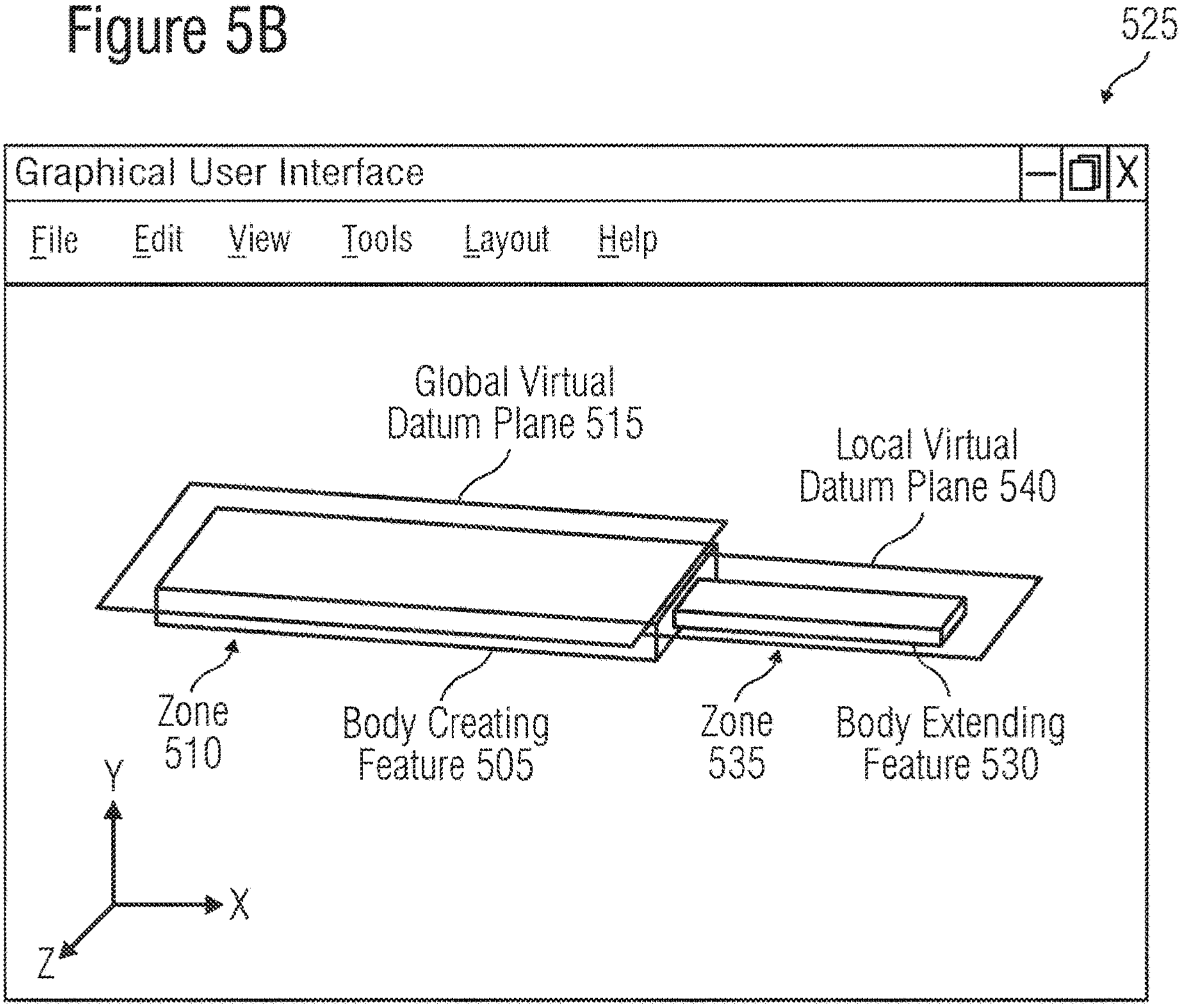

Referring to FIG. 5B, the graphical user interface view 525 depicts creation of a body extending feature 530 (e.g., flexible section of the PCB assembly) in a zone 535. A local virtual datum plane 540 is created in alignment with the global virtual datum plane 515. Thereafter, the body extending feature 530 is generated at an offset from the local virtual datum plane 540 in the zone 535 based on the thickness of the body extending feature 530 as per the zone definition in a flattened state of the PCB assembly.

Figure 5C:
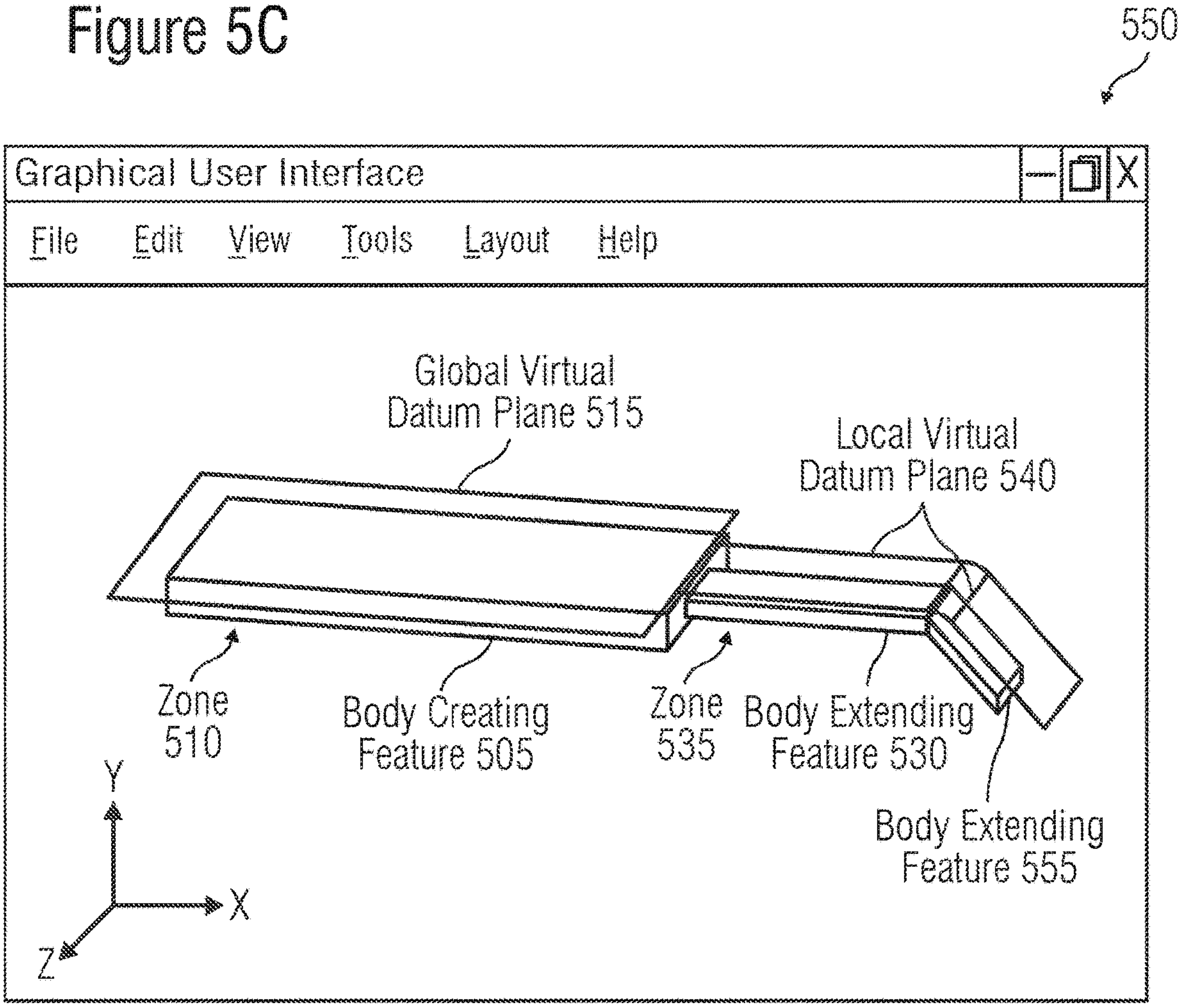

Referring to FIG. 5C, the graphical user interface view 550 depicts creation of a body extending feature 555 (e.g., flexible section of the PCB unit) in the zone 535. The local virtual datum plane 540 is extended in the zone 535 at an orientation of the body extending feature 555. An offset is computed from the local virtual datum plane 540 based on the thickness of the body extension feature 555 and the zone definition in the flattened state. The body extending feature 555 is created at the computed offset from the local virtual datum plane 540 in the zone 535.

Figure 5D:
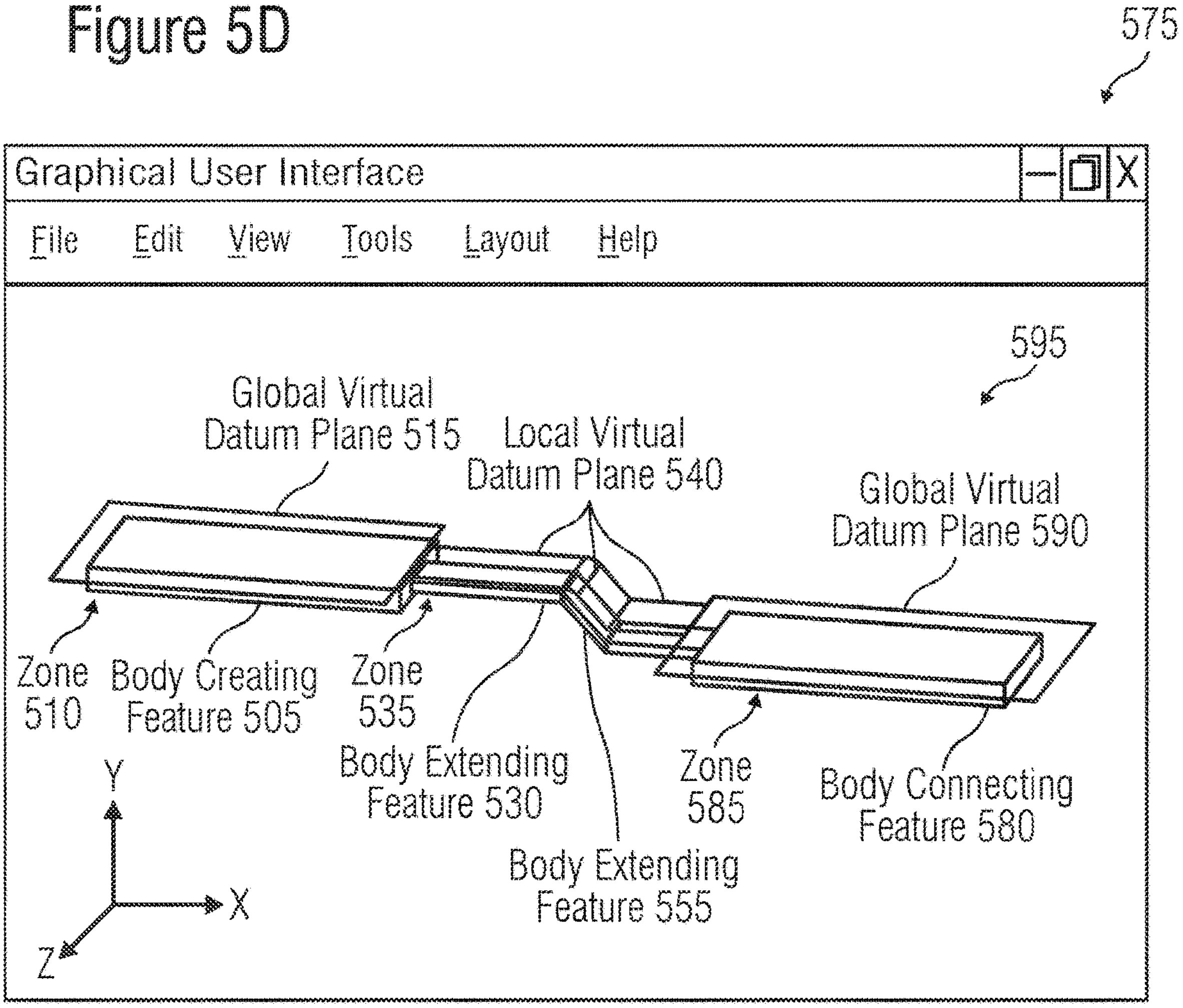

Referring to FIG. 5D, the graphical user interface view 575 depicts creation of a body connecting feature 580 (e.g., a PCB) in a zone 585. A global virtual datum plane 590 is created in the zone 585 in alignment with the local virtual datum plane 540 and the global virtual datum plane 515. Accordingly, the body connecting feature 580 is generated in the zone 585 with reference to the global virtual datum plane 590. Consequently, the three-dimensional model 595 of the PCB assembly is directly generated in a formed state in such a manner that zone definitions in the flattened state are honored and the local virtual datum plane 540 is aligned with the global virtual datum plane 515 and the global virtual datum plane 590 in a flattened state. Also, modification of one zone does affect downstream features in other zones as desired by industry standards. The above methodology ensures that each zone has appropriate location in the flattened state.

Figure 6A:
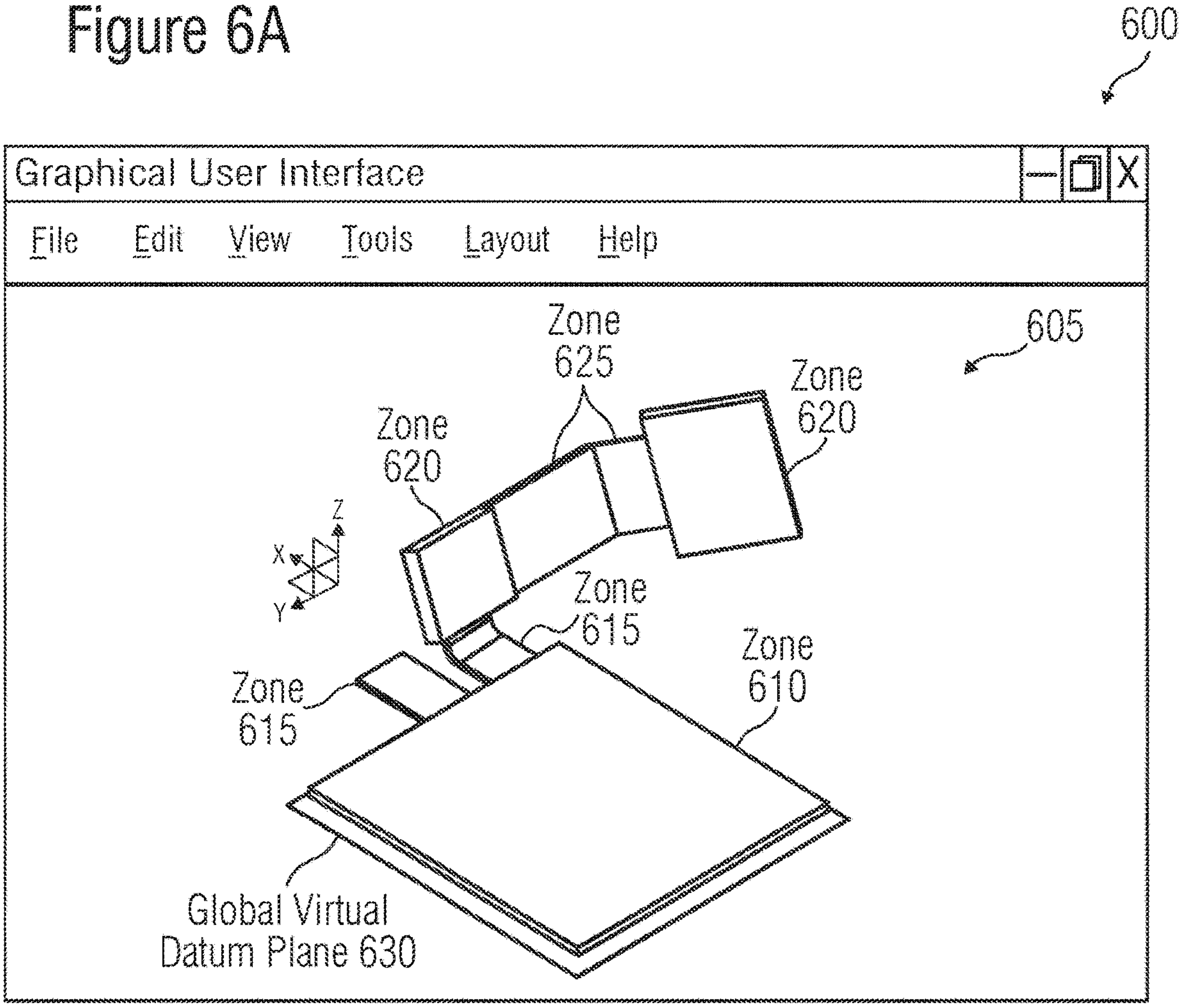
FIGS. 6A-6B are graphical user interface views depicting a PCB assembly in a formed state and a PCB assembly in a flattened state, according to one embodiment.
Figure 6B:
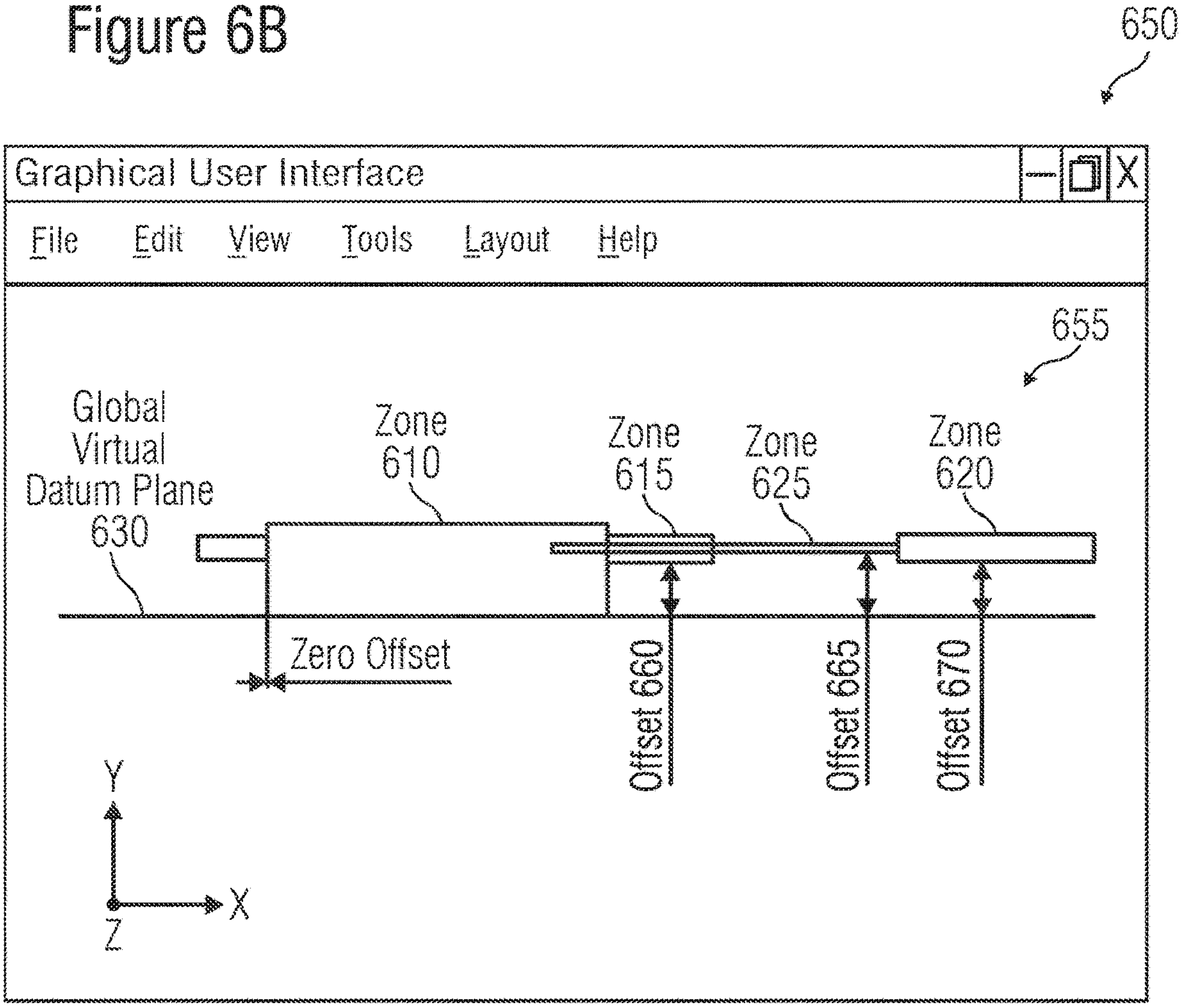

FIGS. 6A-6B are graphical user interface views 600 and 650 depicting a PCB assembly in a formed state and a PCB assembly in a flattened state, according to one embodiment. Referring to FIG. 6A, the graphical user interface view 600 depicts a three-dimensional model 605 of the PCB assembly generated in the formed state, according to steps explained in FIG. 2. The three-dimensional model 605 includes multiple zones 610, 615, 620, and 625. The zones 610, and 620 contains PCBs, and the zones 615 and 625 contains flexible sections connecting the PCBs in the zones 610, and 620 respectively. As can be seen, the zone 610 contains body creating feature which defines a global virtual datum plane 630. The features in the zones 615, 620, and 625 are having different thickness and are offset from the global virtual datum plane 630.

Referring to FIG. 6B, the graphical user interface view 650 depicts a two-dimensional model 655 of the PCB assembly in a flattened state. The zones 615, 620, 625 are offset from the global virtual datum plane by an offset values 660, 665, and 670 respectively. It can be seen that the zone definitions of the PCB assembly are not affected in the flattened state.

Of course, those skilled in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system may conform to any of the various current implementation and practices known in the art.

It is to be understood that the system and methods described herein may be implemented in various forms of hardware, software, firmware, special purpose processors, or a combination thereof. One or more of the present embodiments may take a form of a computer program product including program modules accessible from computer-usable or computer-readable medium storing program code for use by or in connection with one or more computers, processors, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and digital versatile disc (DVD). Both processors and program code for implementing each aspect of the technology can be centralized or distributed (or a combination thereof) as known to those skilled in the art.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

What is claimed is:

1. A method of generating a three-dimensional (3D) model of a multi-thickness object in a formed state in a computer-aided design (CAD) environment, comprising:

generating, by a data processing system, a first feature of a three-dimensional model of a multi-thickness printed circuit board (PCB) in a formed state with reference to a first virtual datum plane based on a first thickness value of the first feature of the three-dimensional model;

receiving, by the data processing system, a request to generate a request to generate a second feature of the three-dimensional model from a user via a graphical user interface, wherein the request comprises a second thickness value of the second feature and a location of the second feature;

creating, by the data processing system, a second virtual datum plane that is aligned with the first virtual datum plane in a flattened state;

dynamically computing, by the data processing system, an offset value for the second feature in the three-dimensional model with reference to the second virtual datum plane based on the second thickness value, wherein the offset value indicates distance by which the second feature is to be offset from the second virtual datum plane;

generating, by the data processing system, the second feature of the three-dimensional model in the formed state with reference to the second virtual datum plane based on the second thickness value, the location of the second feature, and the offset value, wherein the generated second feature is offset from the second virtual datum plane by the offset value;

displaying, by the graphical user interface, the three-dimensional model of the multi-thickness PCB in the formed state comprising the first feature and the second feature in the CAD environment; and manufacturing, by an additive manufacturing process, the multi-thickness PCB having the first feature and the second feature based on the three-dimensional model of the multi-thickness PCB.

2. The method of claim 1, further comprising converting the three-dimensional model of the multi-thickness object in the formed state to a flattened state.

3. The method of claim 2, wherein the first virtual datum plane and the second virtual datum plane lie on a global virtual datum plane in the flattened state, and wherein the second feature of the three-dimensional model is offset by the offset value from the global virtual datum plane in the flattened state.

4. The method of claim 1, wherein dynamically computing the offset value for the second feature in the three-dimensional model with reference to the second virtual datum plane based on the second thickness value comprises:

determining an element of the first feature for creating the second feature; and dynamically computing the offset value for the second feature with reference to the second virtual datum plane based on the determined element and the second thickness value of the second feature.

5. The method of claim 1, wherein the first feature and the second feature belong to a same zone or different zones.

6. The method of claim 1, further comprising creating the first virtual datum plane in the CAD environment.

7. A data processing system comprising:

a processing unit; and a memory unit communicatively coupled to the processing unit, wherein the memory unit comprises a computer-aided design (CAD) module, the CAD module being configured to:

generate a first feature of a three-dimensional model of a multi-thickness printed circuit board (PCB) in a formed state with reference to a first virtual datum plane based on a first thickness value of the first feature;

receive a request to generate a second feature of the three-dimensional model from a user via a graphical user interface, wherein the request comprises a second thickness value of the second feature and a location of the second feature;

create a second virtual datum plane that is aligned with the first virtual datum plane;

dynamically compute an offset value for the second feature in the three-dimensional model with reference to the second virtual datum plane based on the second thickness value, wherein the offset value indicates a distance by which the second feature is to be offset from the second virtual datum plane;

generate the second feature of the three-dimensional model in the formed state with reference to the second virtual datum plane based on the second thickness value, the location of the second feature, and the offset value, wherein the generated second feature is offset from the second virtual datum plane by the offset value;

display the three-dimensional model of the multi-thickness PCB in the formed state comprising the first feature and the second feature on the graphical user interface; and store the three-dimensional model of the multi-thickness PCB for manufacturing the multi-thickness PCB having the first feature and the second feature.

8. The data processing system of claim 7, wherein the CAD module is configured to convert the three-dimensional model of the multi-thickness PCB in the formed state to a flattened state.

9. The data processing system of claim 8, wherein the first virtual datum plane and the second virtual datum plane lie on a global virtual datum plane in the flattened state, and wherein the second feature is offset by the offset value from the global virtual datum plane in the flattened state.

10. The data processing system of claim 7, wherein in the dynamic computation of the offset value for the second feature in the three-dimensional model with reference to the second virtual datum plane based on the second thickness value, the CAD module is configured to:

determine an element of the first feature for creating the second feature; and dynamically compute the offset value for the second feature with reference to the second virtual datum plane based on the determined element and the second thickness value of the second feature.

11. The data processing system of claim 7, wherein the first feature and the second feature belong to same zone or different zones.

12. The data processing system of claim 7, wherein the CAD module is further configured to create the first virtual datum plane in a CAD environment.

13. A non-transitory computer-readable storage medium that stores machine-readable instructions executable by a data processing system to generate a three-dimensional model, the machine-readable instructions comprising:

generating a first feature of a three-dimensional model of a multi-thickness printed circuit board (PCB) in a formed state with reference to a first virtual datum plane based on a first thickness value of the first feature;

receiving a request to generate a second feature of the three-dimensional model from a user via a graphical user interface, wherein the request comprises a second thickness value of the second feature and location of the second feature;

creating a second virtual datum plane that is aligned with the first virtual datum plane;

dynamically computing an offset value for the second feature in the three-dimensional model with reference to the second virtual datum plane based on the second thickness value, wherein the offset value indicates a distance by which the second feature is to be offset from the second virtual datum plane;

generating the second feature of the three-dimensional model in the formed state with reference to the second virtual datum plane based on the second thickness value, the location of the second feature and the offset value, wherein the generated second feature is offset from the second virtual datum plane by the offset value;

displaying the three-dimensional model of the multi-thickness PCB in the formed state comprising the first feature and the second feature on the graphical user interface; and storing the three-dimensional model of the multi-thickness PCB for manufacturing the multi-thickness PCB having the first feature and the second feature.

14. The non-transitory computer-readable storage medium of claim 13, wherein the machine-readable instructions further comprise converting the three-dimensional model of the multi-thickness PCB in the formed state to a flattened state.

15. The non-transitory computer-readable storage medium of claim 14, wherein the first virtual datum plane and the second virtual datum plane lie on a global virtual datum plane in the flattened state, and wherein the second feature is offset by the offset value from the global virtual datum plane in the flattened state.

16. The non-transitory computer-readable storage medium of claim 13, wherein dynamically computing the offset value for the second feature in the three-dimensional model with reference to the second virtual datum plane based on the second thickness value comprises determining an element of the first feature for creating the second feature; and dynamically computing the offset value for the second feature with reference to the second virtual datum plane based on the determined element and the second thickness value of the second feature.

17. The non-transitory computer-readable storage medium of claim 13, wherein the machine-readable instructions further comprise creating the first virtual datum plane in a CAD environment.

* * * * *